US012656890B2

(12) United States Patent
Narula et al.

(10) Patent No.: US 12,656,890 B2
(45) Date of Patent: Jun. 16, 2026

(54) SYSTEM AND METHOD OF AUTOMATICALLY PAIRING A WIRELESS PERIPHERAL DEVICE WITH AN INFORMATION HANDLING SYSTEM FOR SUPPLYING USER INPUT TO INITIALIZE AN OPERATING SYSTEM

(71) Applicant: Dell Products LP, Round Rock, TX (US)

(72) Inventors: Harpreet S. Narula, Austin, TX (US); Kai Leong Wong, Singapore (SG); Bi Wu Xie, Shanghai (CN)

(73) Assignee: DELL PRODUCTS LP, Round Rock, TX (US)

( * ) Notice: Subject to any disclaimer, the term of this patent is extended or adjusted under 35 U.S.C. 154(b) by 44 days.

(21) Appl. No.: 18/649,090

(22) Filed: Apr. 29, 2024

(65) Prior Publication Data

US 2025/0335044 A1 Oct. 30, 2025

(51) Int. Cl.
*G06F 3/038* (2013.01)
*G06F 3/01* (2006.01)
*G06F 3/0354* (2013.01)

(52) U.S. Cl.
CPC .............. *G06F 3/038* (2013.01); *G06F 3/017* (2013.01); *G06F 3/03543* (2013.01); *G06F 2203/0384* (2013.01)

(58) Field of Classification Search
CPC ...... G06F 3/038; G06F 3/017; G06F 3/03543; G06F 2203/0384
See application file for complete search history.

(56) References Cited

U.S. PATENT DOCUMENTS

| | | | | |
|---|---|---|---|---|
| 6,931,456 | B2 * | 8/2005 | Payne | G06F 13/102 |
| | | | | 710/16 |
| 7,165,171 | B2 * | 1/2007 | Zhang | G06F 9/4411 |
| | | | | 710/10 |
| 8,438,319 | B1 | 5/2013 | Edney | |
| 8,732,328 | B2 | 5/2014 | Margulis | |
| 8,838,073 | B2 * | 9/2014 | Sangster | G06F 3/038 |
| | | | | 455/435.2 |
| 9,344,237 | B2 | 5/2016 | Margulis | |
| 10,796,563 | B1 * | 10/2020 | Bell | G04G 7/02 |

(Continued)

*Primary Examiner* — Grant Sitta

(74) *Attorney, Agent, or Firm* — Prol Intellectual Property Law, PLLC; H. Kenneth Prol

(57) ABSTRACT

An information handling system executing a wireless human interface device (HID) compliant out of box experience (OOBE) system comprising a hardware processor to execute code instructions to determine a stored chassis type of a desktop or an all-in-one information handling system and determine capabilities and trust relationship of a peripheral HID via a stored peripheral device extensive markup language content file, and the hardware processor to execute code instructions to pair and operatively couple the wireless HID to the information handling system using a pairing technique and displayed pairing instructions dependent on whether a manufacturer pairing system application has been installed on the information handling system. Then, the hardware processor to execute code instructions to complete the OOBE system to set up the operating system with user input received from the established wireless links with the wireless peripheral HID to initialize an operating system for the information handling system.

20 Claims, 5 Drawing Sheets

(56)  References Cited

U.S. PATENT DOCUMENTS

| | | | |
|---|---|---|---|
| 10,877,716 B2 | 12/2020 | Margulis | |
| 11,132,164 B2 | 9/2021 | Margulis | |
| 11,632,815 B2 * | 4/2023 | Ahmed | G06F 1/1616 |
| | | | 455/41.2 |
| 11,841,951 B2 * | 12/2023 | Vidyadhara | G06F 21/575 |
| 2012/0174199 A1 * | 7/2012 | Perrin | G06F 1/1654 |
| | | | 726/6 |
| 2015/0105014 A1 * | 4/2015 | Kulavik | H04W 76/15 |
| | | | 455/41.1 |
| 2016/0110207 A1 * | 4/2016 | Herzi | G06F 9/44505 |
| | | | 713/1 |
| 2017/0031644 A1 | 2/2017 | Margulis | |
| 2018/0276003 A1 * | 9/2018 | Roszak | G06F 11/1417 |
| 2022/0147467 A1 * | 5/2022 | Hulbert | G06F 13/385 |
| 2023/0259291 A1 * | 8/2023 | Porzio | G06F 12/0238 |
| | | | 711/154 |
| 2023/0289213 A1 | 9/2023 | Liu | |
| 2024/0012766 A1 | 1/2024 | Narula | |

* cited by examiner

SYSTEM AND METHOD OF AUTOMATICALLY PAIRING A WIRELESS PERIPHERAL DEVICE WITH AN INFORMATION HANDLING SYSTEM FOR SUPPLYING USER INPUT TO INITIALIZE AN OPERATING SYSTEM

FIELD OF THE DISCLOSURE

The present disclosure generally relates to a system to operatively couple a new wireless peripheral human interface device (HID) to an information handling system. The present disclosure more specifically relates to a system and method to automatically pair a new wireless peripheral device, commonly owned by or assigned to the user of the information handling system, to the information handling system prior to execution of an out-of-box experience (OOBE) system for initializing the operating system during set up of the information handling system using user input from the paired wireless peripheral HID.

BACKGROUND

As the value and use of information continues to increase, individuals and businesses seek additional ways to process and store information. One option available to clients is information handling systems. An information handling system generally processes, compiles, stores, and/or communicates information or data for business, personal, or other purposes thereby allowing clients to take advantage of the value of the information. Because technology and information handling may vary between different clients or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific client or specific use, such as e-commerce, financial transaction processing, airline reservations, enterprise data storage, or global communications. In addition, information handling systems may include a variety of hardware and software components that may be configured to process, store, and communicate information and may include one or more computer systems, data storage systems, and networking systems. The information handling system may include telecommunication, network communication, and video communication capabilities. The information handling system may be used to execute instructions of one or more workspace productivity applications, or gaming applications or the like. Further, the information handling system may include a radio to operatively couple or pair one or more peripheral devices to the information handling system for use with the information handling system.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings may indicate similar or identical items.

DETAILED DESCRIPTION OF THE DRAWINGS

Figure 1:
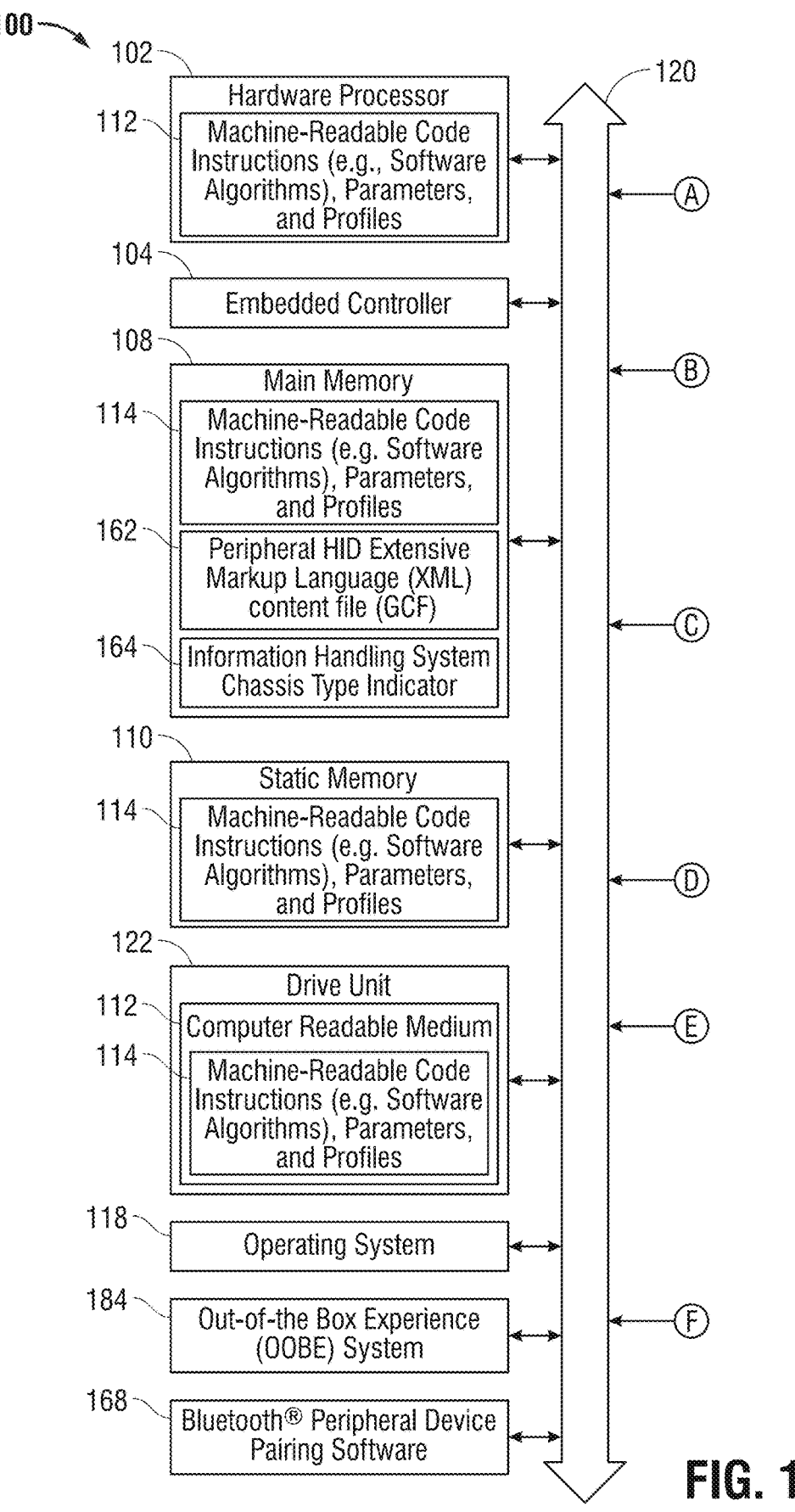
FIG. 1 is a block diagram illustrating an information handling system that may be operatively coupled to one or more wireless peripheral human interface devices (HIDs) for providing user input during a standard out of box experience (OOBE) process for initializing an operating system during setup for the information handling system according to an embodiment of the present disclosure.
Figure 1:
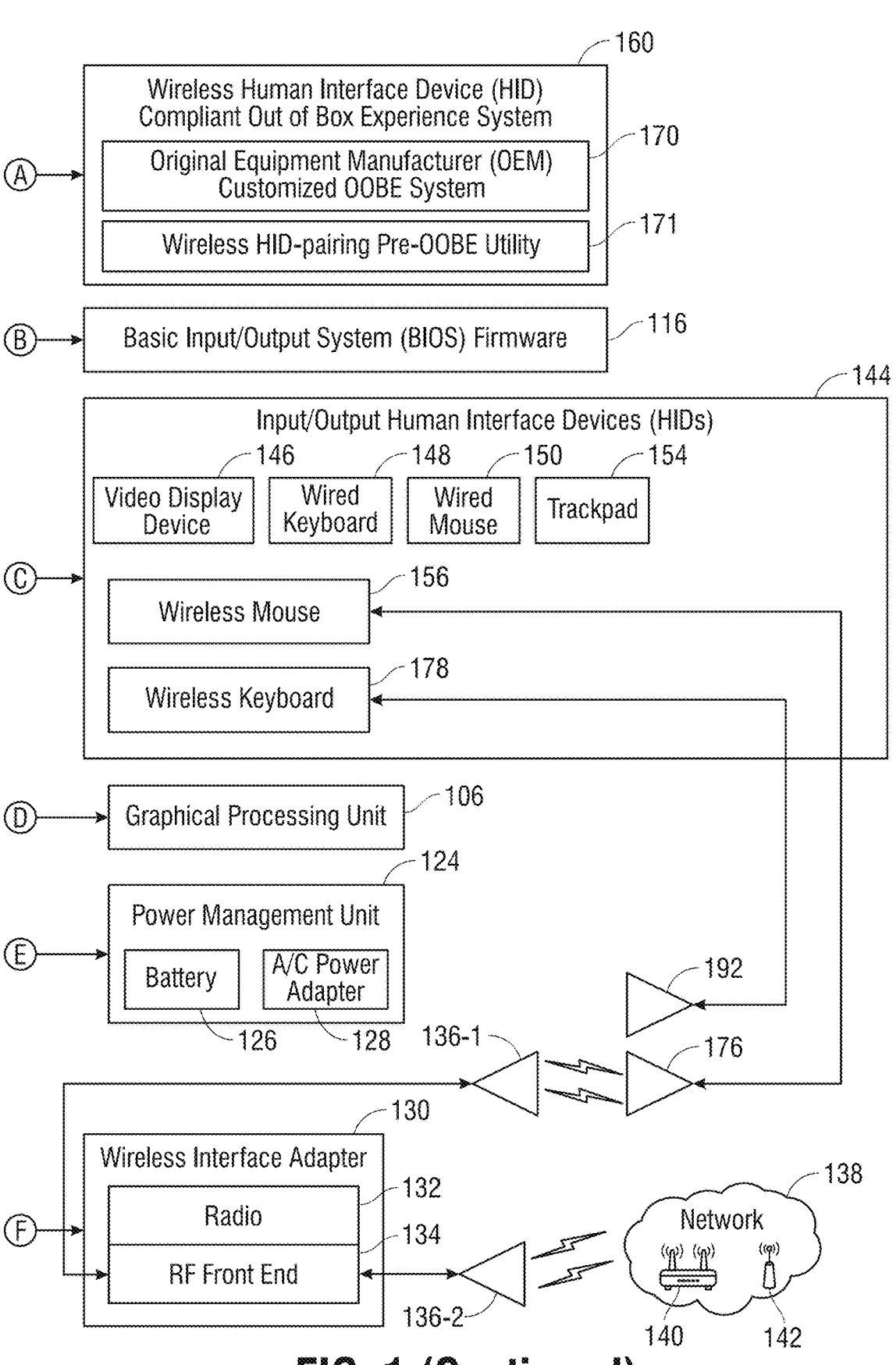

The following description in combination with the Figures is provided to assist in understanding the teachings disclosed herein. The description is focused on specific implementations and embodiments of the teachings and is provided to assist in describing the teachings. This focus should not be interpreted as a limitation on the scope or applicability of the teachings.

Information handling systems may be operatively coupled to a peripheral device that allows the user to interact with the information handling system. These peripheral devices may include a mouse, a keyboard, a video display device, a stylus, a trackpad, and the like that allow a user to provide input to the information handling system and receive output from the information handling system. These peripheral devices may be wired or wirelessly couplable to the information handling system. For wireless coupling, the peripheral device may wirelessly couple through the use of various radio frequency (RF) radios in the information handling system and on the peripheral device. This operative coupling may include an initial step of pairing the peripheral device to the information handling system, for example under Bluetooth® or Bluetooth® Low Energy (BLE) standards of wireless communications. Current pairing processes may include initiation or turning on the information handling system and peripheral device and initiating an initial communication such that a user must enter a pairing code or exchange other confirming pairing data that may be exchanged between the peripheral device and information handling system. In existing systems, this usually occurs after the information handling system operating system has already been initialized through an initial setup or out-of-box experience (OOBE) process in which the user provides various types of user input through wired peripheral human interface devices (HIDs) necessary to initialize the operating system in the proper format (e.g., language, time zone, network setup, etc.) and set up the information handling system.

Often, however, desktop computers or all-in-one computers require purchase of a peripheral HID capable of wired connection (e.g., via Universal Serial Bus (USB)) to the desktop or all-in-one information handling system in order to perform this OOBE process and setup the operating system and the desktop or all-in-one information handling system. However, the user may not wish to continue use of these wired peripheral HIDs following that OOBE process, especially if the desktop or all-in-one information handling system is Bluetooth® or BLE capable. In fact, such wired peripheral HIDs are often returned or discarded immediately following setup in preference for a wireless peripheral HID that may have even been purchased simultaneously with the desktop or all-in-one information handling system when Bluetooth® or BLE capability is present. A system is needed that allows the wireless peripheral HID(s) to pair with the information handling system prior to or at the very beginning of execution of the standard OOBE process, such that those wireless peripheral HIDs may be paired and wirelessly coupled and operational to provide any user input necessary during the standard OOBE process. Those wireless peripheral HIDs may then also remain paired to the information handling system following completion of the standard OOBE process and upon startup of the initialized operating system.

The computer-executable code instructions of a wireless HID compliant OOBE system, such as a wireless HID-pairing pre-OOBE utility or an original equipment manufacturer (OEM) customized version of the OOBE process, to execute a Bluetooth® peripheral device pairing software utility, such as an OEM pairing application system pre-loaded or another pairing system utility if no OEM pairing application system is pre-loaded in embodiments of the present disclosure. The computer-executable code instructions of a wireless HID compliant OOBE system may address these issues by providing user interface displays and capability for pairing the wireless peripheral HID(s) with the desktop or all-in-one information handling system prior to or at the beginning of execution of the standard OOBE process in embodiments of the present disclosure. Upon startup of a newly purchased or newly assigned information handling system (e.g., by an enterprise information technology decision maker (ITDM)) within range of one or more Bluetooth® peripheral HIDs, a stored information handling system chassis type indicator file stored in memory, such as a Win32 device chassis type file, may be referenced in order to detect whether the information handling system is a desktop or an all-in-one system. This may indicate that the information handling system is a desktop or all-in-one and does not have an incorporated keyboard and touchpad common to laptops or tablets, and may require external HID input for user input during the initial setup of the information handling system through an OOBE process. In embodiments herein, pairing a wireless HID may be desirable by a user over a wired connection a keyboard, mouse, or touchpad for providing that external HID input.

A stored Peripheral device Extensive Markup Language (XML) content file (GCF.xml) for peripheral HIDs may be stored in memory. Commonly owned or assigned peripheral HIDs to the desktop or all-in-one information handling system owner may be referenced by a hardware processor of the desktop or all-in-one information handling system executing code instructions of the wireless HID compliant OOBE system in embodiments herein to identify one or more wireless peripheral HIDs capable of pairing with the desktop or all-in-one information handling system to provide the necessary input for completion of the initial OOBE process to setup the operating system. The hardware processor may execute code instructions of the wireless HID compliant OOBE system to determine whether a peripheral HID listed in the peripheral device GCF.xml file supports Bluetooth® or other wireless communication. Further, a configuration file may determine whether the desktop or all-in-one information handling system supports Bluetooth® or other wireless communication. If one or more peripheral HIDs listed within the peripheral device GCF.xml file support Bluetooth® or other wireless communication, this may indicate that such a peripheral HID needs to be paired with the desktop or all-in-one information handling system in order to perform the OOBE process to initialize the operating system. If no peripheral HIDs listed within the peripheral device GCF.xml file support Bluetooth® or other wireless communication or the desktop or all-in-one information handling system does not support Bluetooth® or other wireless communication, this may indicate that a peripheral HID will need to be operatively coupled to the desktop or all-in-one information handling system via a wired link, and there is no such need to pair wirelessly with the desktop or all-in-one information handling system in order to perform the OOBE process to initialize the operating system.

Where the hardware processor has executed code instructions of the wireless HID compliant OOBE system to determine that wireless pairing with a wireless peripheral HID is possible in order to complete the OOBE system, the hardware processor may also execute such code instructions to determine whether the information handling system is capable of operating a pre-loaded OEM pairing application system type of Bluetooth® peripheral device pairing software utility that operates with an OEM customized version of the OOBE process, such as Dell® Pair. If not, a wireless HID-pairing pre-OOBE utility may be inserted prior to the OOBE process to pair specific Bluetooth® peripheral HIDs known to have common ownership or assignment with the information handling system to a single user, with minimal user input required. If the information handling system is capable of operating the OEM customized version of the OOBE process with the seamless Bluetooth® peripheral device pairing software utility such as the pre-loaded OEM pairing application system, the hardware processor may execute code instructions of the OEM customized version of the OOBE process to pair such commonly owned or assigned Bluetooth® peripheral HID(s) to the information handling system in an embodiment. As a first step at the very beginning of the OOBE process, hardware processor of the information handling system may execute code instructions of an OEM customized version of the OOBE process to pair the Bluetooth® peripheral HIDs and then to initialize the operating system for the information handling system. The OEM customized version of the OOBE process operates to overlay pairing instructions over the standard OOBE process steps at the very initial stages of the OOBE process. Alternatively, if no OEM customized version of the OOBE process will overlay on the standard OOBE process, the hardware processor may execute code instructions for presentation of a wireless HID-pairing pre-OOBE utility as the Bluetooth® peripheral device pairing software utility prior to the standard OOBE process begins for initializing the operating system for the information handling system.

When the information handling system is capable of operating a Bluetooth® peripheral device pairing software utility that is either a pre-loaded OEM pairing application system, using OEM customized version of the OOBE process or another pairing system with the wireless HID-pairing pre-OOBE utility, an OEM Filter Driver at the information handling system may initiate the Bluetooth® peripheral device pairing software utility to pair a wireless mouse or wireless keyboard that can be used to provide necessary user input for the remaining portions of the standard OOBE process. A Bluetooth® wireless mouse within Bluetooth® range of the information handling system may then be paired to the information handling system using a zero-click method or a one-click method in which the user moves the mouse or click a button according to a displayed instruction on the video display device during execution of the Bluetooth® peripheral device pairing software utility. Additionally, a Bluetooth® wireless keyboard within Bluetooth® range of the information handling system may be paired to the information handling system in an embodiment using a one-click method in which the user presses a single, specific key of the keyboard according to a displayed instruction on the video display device during execution of a seamless Bluetooth® peripheral device pairing software utility such as a pre-loaded OEM pairing application system. In other embodiments, a zero-click pairing may be conducted with pre-loaded or securely provisioned, seeded pairing passcode generation at both the desktop or all-in-one information handing system and the wireless peripheral HID systems as part of a pre-loaded OEM pairing application system. The information handling system may execute code instructions of the seamless Bluetooth® peripheral device pairing software utility of either a pre-loaded OEM pairing application system or another available pairing system to wirelessly communicate via generic attribute (GATT) BLE or Bluetooth® pairing communications with the wireless mouse, wireless keyboard or other wireless HID pair the wireless mouse, wireless keyboard, or other wireless HID which will become operational prior to or at the very beginning of the OOBE process to provide necessary user input for the remaining portions of the standard OOBE process in embodiments herein.

The remaining portions of the standard OOBE process may then be executed in embodiments herein, using the paired wireless peripheral HID(s) to provide any necessary user input. The operating system for the information handling system may then initialize, sometimes following one or more reboot processes. The wireless peripheral HID(s) that were previously paired with the information handling system in embodiments may continue to communicate with information handling system via those previously established wireless links, negating the need for further pairing. In such a way, the Bluetooth® peripheral device pairing software utility and the wireless HID compliant OOBE system in embodiments of the present disclosure may pair one or more wireless peripheral HIDs prior to execution of a standard OOBE process in order to allow for such wireless peripheral HIDs to provide user input necessary to complete the standard OOBE process in such a way as to further allow for continued wireless connection of the paired wireless peripheral HIDs following completion of the standard OOBE process and initialization of the information handling system operating system.

Turning now to the figures, FIG. 1 illustrates an information handling system 100 similar to the information handling systems according to several aspects of the present disclosure. The information handling system 100 may be one of a plurality of information handling systems to which any number of input/output human interface devices (HIDs) 144 such as peripheral devices or HIDs 156, 178, 146, 148, 150, and 154 may pair. Some of these input/output HIDs may be peripheral devices that may be wired options, such as wired mouse 148 and wired keyboard 150. Wired input/output HIDs 144 operatively couple with the information handling system via a wired link (e.g., Universal Serial Bus (USB)). Other input/output HIDs or peripheral devices 144, such as wireless mouse 156 and wireless keyboard 178 in an embodiment may be wireless, such that they operatively couple with the information handling system via wireless links (e.g., under the Bluetooth® or Bluetooth® Low Energy (BLE) communication protocols or others, for example). As described herein, the Bluetooth® peripheral device pairing software utility 168 and the wireless HID compliant OOBE system 160 of the information handling system 100 may operate together in an embodiment may pair one or more wireless peripheral HIDs, such as wireless mouse 156 and wireless keyboard 178 prior to or at the beginning of execution of a standard OOBE process 184 to initialize the operating system 118 and set up information handling system 100. Depending on type of wireless HID compliant OOBE system 160 installed on the information handling system 100, either an original equipment manufacturer (OEM) customized OOBE system 170 or a wireless HID-pairing pre-OOBE utility 171 may be used with the Bluetooth® peripheral device pairing software utility 168 in order to allow for such wireless peripheral HIDs 156 and 178 pair before the OOBE system executes the full OOBE process to provide user input necessary to complete the standard OOBE process of the OOBE system 184. This may be completed in such a way as to further allow for continued wireless connection of the paired wireless peripheral input/output HIDs 144 such as wireless mouse 156 and wireless keyboard 178 following completion of the standard OOBE process 184 and initialization of the information handling system 100 operating system 118.

In the embodiments described herein, an information handling system 100 includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system 100 may be a personal computer, mobile device (e.g., personal digital assistant (PDA) or smart phone), server (e.g., blade server or rack server), a consumer electronic device, a network server or storage device, a network router, switch, or bridge, wireless router, or other network communication device, a network connected device (cellular telephone, tablet device, etc.), IoT computing device, wearable computing device, a set-top box (STB), a mobile information handling system, a palmtop computer, a laptop computer, a desktop computer, a communications device, an access point (AP) 140, a base station transceiver 142, a wireless telephone, a control system, a camera, a scanner, a printer, a personal trusted device, a web appliance, or any other suitable machine capable of executing a set of instructions (sequential or otherwise) that specify actions to be taken by that machine, and may vary in size, shape, performance, price, and functionality.

In a networked deployment, the information handling system 100 may operate in the capacity of a client computer in a server-client network environment, or as a peer computer system in a peer-to-peer (or distributed) network environment. In an embodiment, the information handling system 100 may be implemented using electronic devices that provide voice, video, or data communication. For example, an information handling system 100 may be any mobile or other computing device capable of executing a set of instructions (sequential or otherwise) that specify actions to be taken by that machine. Further, while a single information handling system 100 is illustrated, the term "system" shall also be taken to include any collection of systems or sub-systems that individually or jointly execute a set, or plural sets, of instructions to perform one or more computer functions.

The information handling system 100 may include main memory 108, (volatile (e.g., random-access memory, etc.), or static memory 110, nonvolatile (read-only memory, flash memory etc.) or any combination thereof), one or more hardware processing resources, such as a hardware processor 102 that may be a central processing unit (CPU), embedded controller (EC) 104, a graphics processing unit (GPU) 106, or any combination thereof. Additional components of the information handling system 100 may include one or more storage devices such as static memory 110 or drive unit 122. The information handling system 100 may include or interface with one or more communications ports for communicating with external devices, as well as various input and output (I/O) devices 144, such as a wireless mouse 156, a wireless keyboard 178, a video display device 146, a wired keyboard 148, a wired mouse 150, and a trackpad 154, or any combination thereof. Portions of an information handling system 100 may themselves be considered information handling systems 100.

Information handling system 100 may include devices or modules that embody one or more of the devices or execute instructions for one or more systems and modules. The information handling system 100 may execute instructions (e.g., software algorithms), parameters, and profiles 114 that may operate on servers or systems, remote data centers, or on-box in individual client information handling systems according to various embodiments herein. In some embodiments, it is understood any or all portions of instructions (e.g., software algorithms), parameters, and profiles 114 may operate on a plurality of information handling systems 100.

The information handling system 100 may include the hardware processor 102 such as a central processing unit (CPU) or other hardware processing resources. Any of the hardware processing resources may operate to execute code that is either firmware or software code. Moreover, the information handling system 100 may include memory such as main memory 108, static memory 110, and disk drive unit 122 (volatile (e.g., random-access memory, etc.), nonvolatile memory (read-only memory, flash memory etc.) or any combination thereof or other memory with computer readable medium 112 storing instructions (e.g., software algorithms), parameters, and profiles 114 executable by the hardware processor 102, EC 104, GPU 106, or any other hardware processing device. The information handling system 100 may also include one or more buses 120 operable to transmit communications between the various hardware components such as any combination of various I/O devices 144 as well as between hardware processors 102, an EC 104, the operating system (OS) 118, the basic input/output system (BIOS) 116, the wireless interface adapter 130, or a radio module, among other components described herein. In an embodiment, the hardware processor 102, EC 104, and/or GPU 106 may execute one or more bus drivers in order to transmit this data between the information handling system 100 and the input/output devices 144 described herein. In an embodiment, the information handling system 100 may be in wired or wireless communication with the I/O HIDs 144 such as a wireless mouse 156, a wireless keyboard 178, a video display device 146, a wired keyboard 148, a wired mouse 150, and a trackpad 154, or any combination thereof, among other peripheral devices.

As described herein, the information handling system 100 further includes a video/graphics display device 146. The video/graphics display device 146 in an embodiment may function as a liquid crystal display (LCD), an organic light emitting diode (OLED), a flat panel display, or a solid-state display. It is appreciated that the video/graphics display device 146 may be wired or wireless and may be an external video/graphics display device 146 that allows a user to increase the desktop area by extending the desktop in an embodiment. Additionally, as described herein, the information handling system 100 may include or be operatively coupled to a cursor control device (e.g., a trackpad 154, or gesture or touch screen input), a wireless mouse 156, a wireless keyboard 178, a wired keyboard 148, a wired mouse 150, among others that allows the user to interface with the information handling system 100 via the video/graphics display device 146. Information handling system 100 may also be operatively coupled to a wired or wireless input/output device 144, such as a wireless mouse 156, a wireless keyboard 178, a video display device 146, a wired keyboard 148, a wired mouse 150, and a trackpad 154, that may include a hardware processing device such as a hardware processor, microcontroller, or other hardware processing resource. Various drivers and hardware control device electronics may be operatively coupled to operate the I/O devices 144 according to the embodiments described herein.

A network interface device of the information handling system 100 may be wired or wireless such as shown with wireless interface adapter 130 that can provide wireless connectivity among devices such as with Bluetooth® or to a network 138, e.g., a wide area network (WAN), a local area network (LAN), wireless local area network (WLAN), a wireless personal area network (WPAN), a wireless wide area network (WWAN), or other network. In embodiments described herein, the wireless interface device 130 with its radio 132, RF front end 134 and antennas 136-1 or 136-2 are used to communicate with the wireless peripheral devices including the wireless mouse 156 and wireless keyboard 178, via, for example, a Bluetooth® or Bluetooth® Low Energy (BLE) protocols. In other embodiments, the trackpad 154 or the video display device 146 may be wireless and capable of communicating with the information handling system via Bluetooth® or BLE protocols. In still other embodiments, Bluetooth®, BLE or other WPAN or WLAN may be used for communication with and among a wireless peripheral devices such as the wireless mouse 156, a wireless keyboard 178, or any other wireless peripheral device to be paired with the information handling system 100.

In other embodiments, a WAN, WWAN, LAN, and WLAN may each include an AP 140 or base station 142 used to operatively couple the information handling system 100 to a network 138 via a wireless interface adapter 130 and the antenna or antennas 136-1 or 136-2. In a specific embodiment, the network 138 may include macro-cellular connections via one or more base stations 142 or a wireless AP 140 (e.g., Wi-Fi), or such as through licensed or unlicensed WWAN small cell base stations 142. Connectivity may be via wired or wireless connection. For example, wireless network wireless APs 140 or base stations 142 may be operatively connected to the information handling system 100. Wireless interface adapter 130 may include one or more RF (RF) subsystems (e.g., radio 132) with transmitter/receiver circuitry, modem circuitry, one or more antenna RF (RF) front end circuits 134, one or more wireless controller circuits, amplifiers, antennas 136-1 or 136-2 and other circuitry of the radio 132 such as one or more antenna ports used for wireless communications via multiple radio access technologies (RATs). The radio 132 may communicate with one or more wireless technology protocols.

In an embodiment, the wireless interface adapter 130 may operate in accordance with any wireless data communication standards. To communicate with a wireless local area network, standards including IEEE 802.11 WLAN standards (e.g., IEEE 802.11ax-2021 (Wi-Fi 6E, 6 GHz)), IEEE 802.15 WPAN standards, WWAN such as 3GPP or 3GPP2, Bluetooth® standards, or similar wireless standards may be used. Wireless interface adapter 130 may connect to any combination of macro-cellular wireless connections including 2G, 2.5G, 3G, 4G, 5G or the like from one or more service providers. Utilization of radiofrequency communication bands according to several example embodiments of the present disclosure may include bands used with the WLAN standards and WWAN carriers which may operate in both licensed and unlicensed spectrums. The wireless interface adapter 130 can represent an add-in card, wireless network interface module that is integrated with a main board of the information handling system 100 or integrated with another wireless network interface capability, or any combination thereof.

In some embodiments, software, firmware, dedicated hardware implementations such as application specific integrated circuits, programmable logic arrays and other hardware devices may be constructed to implement one or more of some systems and methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system encompasses software, firmware, and hardware implementations.

In accordance with various embodiments of the present disclosure, the methods described herein may be implemented by firmware or software programs executable by a hardware controller or a hardware processor system. Further, in an exemplary, non-limited embodiment, implementations may include distributed hardware processing, component/object distributed hardware processing, and parallel hardware processing. Alternatively, virtual computer system processing may be constructed to implement one or more of the methods or functionalities as described herein.

The present disclosure contemplates a computer-readable medium that includes computer-readable code instructions, parameters, and profiles 114 or receives and executes instructions, parameters, and profiles 114 responsive to a propagated signal, so that a hardware device connected to a network 138 may communicate voice, video, or data over the network 138. Further, the instructions 114 may be transmitted or received over the network 138 via the network interface device or wireless interface adapter 130.

The information handling system 100 may include a set of instructions 114 that may be executed to cause the computer system to perform any one or more of the methods or computer-based functions disclosed herein. For example, instructions 114 may be executed by a hardware processor 102, GPU 106, EC 104 or any other hardware processing resource and may include software agents, or other aspects or components used to execute the methods and systems described herein. Various software modules comprising application instructions 114 may be coordinated by an OS 118, and/or via an application programming interface (API) include a unified device API described herein. An example OS 118 may include Windows®, Android®, and other OS types. Example APIs may include Win 32, Core Java API, or Android APIs.

In an embodiment, the information handling system 100 may include a disk drive unit 122. The disk drive unit 122 and may include machine-readable code instructions, parameters, and profiles 114 in which one or more sets of machine-readable code instructions, parameters, and profiles 114 such as firmware or software can be embedded to be executed by the hardware processor 102 or other hardware processing devices such as a GPU 106 or EC 104, or other microcontroller unit to perform the processes described herein. Similarly, main memory 108 and static memory 110 may also contain a computer-readable medium for storage of one or more sets of machine-readable code instructions, parameters, or profiles 114 described herein. The disk drive unit 122 or static memory 110 also contain space for data storage. Further, the machine-readable code instructions, parameters, and profiles 114 may embody one or more of the methods as described herein. In a particular embodiment, the machine-readable code instructions, parameters, and profiles 114 may reside completely, or at least partially, within the main memory 108, the static memory 110, and/or within the disk drive 122 during execution by the hardware processor 102, EC 104, or GPU 106 of information handling system 100.

Main memory 108 or other memory of the embodiments described herein may contain computer-readable medium (not shown), such as RAM in an example embodiment. An example of main memory 108 includes random access memory (RAM) such as static RAM (SRAM), dynamic RAM (DRAM), non-volatile RAM (NV-RAM), or the like, read only memory (ROM), another type of memory, or a combination thereof. Static memory 110 may contain computer-readable medium (not shown), such as NOR or NAND flash memory in some example embodiments. The applications and associated APIs, for example, may be stored in static memory 110 or on the disk drive unit 122 that may include access to a machine-readable code instructions, parameters, and profiles 114 such as a magnetic disk or flash memory in an example embodiment. While the computer-readable medium is shown to be a single medium, the term "computer-readable medium" includes a single medium or multiple media, such as a centralized or distributed database, and/or associated caches and servers that store one or more sets of machine-readable code instructions. The term "computer-readable medium" shall also include any medium that is capable of storing, encoding, or carrying a set of machine-readable code instructions for execution by a processor or that cause a computer system to perform any one or more of the methods or operations disclosed herein.

In an embodiment, the information handling system 100 may further include a power management unit (PMU) 124 (a.k.a. a power supply unit (PSU)). The PMU 124 may include a hardware controller and executable machine-readable code instructions to manage the power provided to the components of the information handling system 100 such as the hardware processor 102 and other hardware components described herein. The PMU 124 may control power to one or more components including the one or more drive units 122, the hardware processor 102 (e.g., CPU), the EC 104, the GPU 106, a video/graphic display device 146, or other wired I/O devices 144 such as a wireless mouse 156, a wireless keyboard 178, a video display device 146, a wired keyboard 148, a wired mouse 150, a trackpad 154, and other components that may require power when a power button has been actuated by a user. In an embodiment, the PMU 124 may monitor power levels and be electrically coupled to the information handling system 100 to provide this power. The PMU 124 may be coupled to the bus 120 to provide or receive data or machine-readable code instructions. The PMU 124 may regulate power from a power source such as the battery 126 or AC power adapter 128. In an embodiment, the battery 126 may be charged via the AC power adapter 128 and provide power to the components of the information handling system 100, via wired connections as applicable, or when AC power from the AC power adapter 128 is removed.

In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium 110 can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or machine-readable code instructions may be stored.

In other embodiments, dedicated hardware implementations such as application specific integrated circuits (ASICs), programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses hardware resources executing software or firmware, as well as hardware implementations.

As described herein, the Bluetooth® peripheral device pairing software utility 168 and the wireless HID compliant OOBE system 160 of the information handling system 100 in an embodiment may pair one or more wireless peripheral HIDs, such as wireless mouse 156 and wireless keyboard 178 prior to or at the very beginning of execution of a standard OOBE process of the OOBE system 184, depending on whether an OEM customized OOBE system 170 or a wireless HID-pairing pre-OOBE utility 171 is used. Then, the paired wireless peripheral HIDs, such as wireless mouse 156 and wireless keyboard 178, are operational to interface with the standard OOBE process of the OOBE system 184 when it is initiated or continued progress of the OEM customized OOBE system 170 to initialize the operating system 118 and set up the information handling system according to embodiments herein. This may be completed in such a way as to further allow for continued wireless connection of the paired wireless peripheral HIDs 156 and 178 following completion of the standard OOBE process 184 and initialization of the information handling system 100 operating system 118.

A user of the information handling system 100 may start up a newly purchased or newly assigned desktop or all-in-one information handling system 100, such as by pressing a power on button, for initialization in an embodiment of its operating system 118 in range of one or more Bluetooth® peripheral human interface devices (HIDs), such as the wireless mouse 156 or wireless keyboard 178. This may cause the PMU 124 to supply power to the hardware processor 102 and trigger execution of code instructions for the wireless Human Interface Device (HID) compliant out of box experience system 160 by the hardware processor 102 in an embodiment. In an embodiment, a stored information handling system chassis type indicator file stored in memory 108, 110, or 122 may be referenced in order to detect if the information handling system 100 is a desktop or an all-in-one system. The chassis type indicator file may be loaded at the original equipment manufacturer (OEM) for the information handling system 100 upon purchase of the information handling system 100. This may indicate that the information handling system 100 does not have an incorporated keyboard (not shown) and touchpad (not shown) common to laptops and tablets, and may require wireless pairing or wired connection to a keyboard (e.g., 178 or 148) and mouse (e.g., 156 or 150) or touchpad (e.g., 154) for user input during the initial setup of the information handling system 100 through an OOBE process executed by the OOBE system 184.

A stored peripheral device Extensive Markup Language (XML) content file (GCF.xml) for peripheral HIDs may be stored in memory 108, 110, or 122 and be supplied with wireless peripheral HID hardware types that may be commonly owned by or assigned to the information handling system 100 owner for being paired with the information handling system 100. This GCF.xml file may be referenced during execution by the hardware processor 102 of the code instructions of the wireless HID compliant out of box experience system 160 to identify one or more peripheral device types, such as 156, 178, 146, 148, 150, or 154, owned by the same user that owns the information handling system 100 for pairing and the capabilities such as Bluetooth® functionality supported by those peripheral device types. This GCF.xml file may be loaded within a full flash update image installed at the original equipment manufacturer (OEM) for the information handling system 100 upon purchase by the single user of the information handling system 100 and the one or more peripheral devices to include peripheral device type or types, such as 156, 178, 146, 148, 150, or 154, that will be used with the information handling system. For example, common ownership from a customer order file of the information handling system 100 may indicate that any wireless peripheral device types, such as 156 or 178 listed within the GCF.xml file are trusted devices that may be paired to the information handling system 100 using minimal user input.

It may be determined in an embodiment whether a peripheral HID listed in the peripheral device GCF.xml file supports Bluetooth® wireless communication or some other device capabilities such as connector types or other wireless protocols. For example, the hardware processor 102 may execute code instructions of the wireless HID compliant out of box experience system 160 to determine that, of the peripheral devices 156, 178, 146, 148, 150, and 154 listed within the GCF.xml file described directly above, wireless peripheral devices 156 and 178 are wireless peripheral devices capable of communicating with the information handling system 100 via Bluetooth® or BLE wireless links. This may indicate that such a peripheral HID, such as wireless mouse 156 or wireless keyboard 178 may wirelessly pair with the information handling system 100 as an initial matter in order to execute the steps of the OOBE system 184 as modified by the wireless HID compliant OOBE system 160 of either type 170 or 171 to initialize the operating system 118.

In an embodiment, the hardware processor 102 may execute code instructions of the wireless HID compliant OOBE system 160 to determine whether the information handling system 100 is capable of operating a Bluetooth® peripheral device pairing software utility 168 that is a pre-loaded OEM pairing application system to seamlessly pair specific Bluetooth® peripheral HIDs, such as 156 or 178, known to have common ownership or assignment with the information handling system 100 using minimal user input. Such a seamless Bluetooth® peripheral device pairing software utility 168 that is a pre-loaded OEM pairing application system, such as Dell Pair®, may be a software utility that supports pairing automatically and seamlessly to trusted Bluetooth devices, such as 156 and 178 that are commonly owned with the information handling system 100. When activated, either type of Bluetooth® peripheral device pairing software utility 168 may automatically prompt pairing with any such trusted Bluetooth® devices, such as 156 and 178, within Bluetooth® range of the information handling system 100. If the information handling system 100 has a pre-loaded OEM pairing application system that is a seamless Bluetooth® peripheral device pairing software utility 168, the seamless Bluetooth® peripheral device pairing software utility 168 may pair such commonly owned or assigned Bluetooth® peripheral HID (s), such as 156 and 178 to the information handling system 100 as a first step, prior to or at the beginning of the standard OOBE system 184 process to initialize the operating system 118. The information handling system 100 may operate the seamless Bluetooth® peripheral device pairing software utility 168 in coordination with an OEM customized OOBE system 170 or a wireless HID-pairing pre-OOBE utility 171 to execute to assist in pairing the Bluetooth® peripheral HIDs, such as 156 and 178. The OEM customized OOBE system 170 or a wireless HID-pairing pre-OOBE utility 171 interfaces with the user to conduct the initial pairing via methods available via the pre-loaded OEM pairing application system of the seamless Bluetooth® peripheral device pairing software utility 168. Then the operating system 118 continues to be initialized for setting up the information handling system 100.

In an embodiment, the Bluetooth® peripheral device pairing software utility 168 in coordination with an OEM customized OOBE system 170 or a wireless HID-pairing pre-OOBE utility 171 use the OEM customized pairing displayed images overlayed the OOBE process from an OEM customized OOBE process where the OEM custom pairing method or system is part or a Win32 file format, when available or use distinctly inserted pre-OOBE instructional displayed images from full flash update file type such as an OOBE.xml file in embodiments herein. These displayed instructional pairing images may step the user through the process of pairing the specific wireless peripheral HIDs, such as 156 and 178 identified within the GCF.xml file described above, with the desktop or all-in-one information handling system prior to or at the very beginning of the execution of the OOBE process of the OOBE system 184. The seamless Bluetooth® peripheral device pairing software utility 168 may be distinct for an OEM pair process using the pre-loaded OEM pairing application system compared to a standard system that does not use a specific OEM pairing process. Nonetheless, either type Bluetooth® peripheral device pairing software utility 168, a pre-loaded OEM pairing application system or a non OEM specific pairing process, operates to receive inputs at the wireless peripheral devices 156 and 178 as well as set up Bluetooth or BLE pre-pairing communications and exchange of Bluetooth or BLE pairing credentials and authorizations from various methods or techniques made available to pair.

In one example embodiment, a Bluetooth® wireless mouse 156 within Bluetooth® range of the information handling system 100 may be paired to the information handling system 100 using such a seamless Bluetooth® peripheral device pairing software utility 168. Such a pairing with a pre-loaded OEM pairing application system may include a zero-click method in which the user moves the mouse 156 according to a displayed instruction on the video display device 146 during execution of the seamless Bluetooth® peripheral device pairing software utility 168. This curtailed or minimal user input method may be used specifically due to the fact that the hardware processor 102 executing code instructions of the wireless HID compliant OOBE system 160 has identified the wireless mouse 156 as a trusted device through reference to the GCF.xml file described above. In another embodiment, pairing passcode generation or pairing passcode may be pre-loaded by the manufacturer to provide for an ability to encrypt or exchange pre-loaded pairing passcodes or for generation via a hash algorithm and a pre-loaded seed value to generate the pairing passcodes at the wireless peripheral devices such as 156 and 178 as well as information handling system 100 in embodiments herein. Then the matching passcodes may be verified by encrypted or secure exchange of passcodes or verification of the same in some embodiments. In other embodiments, the Bluetooth® peripheral device pairing software utility 168 may use a method that requires more user input in order to ensure a higher degree of security in such a pairing process. For example, the Bluetooth® peripheral device pairing software utility 168 may require the user to perform multiple types of user input via the wireless mouse 156, or may require entry of one or more passcodes or pairing credentials via a keyboard, such as the wired keyboard 150 or the wireless keyboard 178.

In another example embodiment, a Bluetooth® wireless keyboard 178 within Bluetooth® range of the information handling system 100 may be paired to the information handling system 100 using the Bluetooth® peripheral device pairing software utility 168. This pairing process may invoke a pre-loaded OEM pairing application system that includes a one-click method in which the user presses a single, specific key of the keyboard 178 or a mouse 156 according to a displayed instruction on the video display device 146 during execution of the seamless Bluetooth® peripheral device pairing software utility 168. This curtailed or minimal user input method may be used specifically due to the fact that the hardware processor 102 executing code instructions of the wireless HID compliant OOBE system 160 has identified the wireless keyboard 178 as a trusted device through reference to the GCF.xml file described above. In other embodiments, the Bluetooth® peripheral device pairing software utility 168 may use a method that requires more user input in order to ensure a higher degree of security in such a pairing process. For example, the Bluetooth® peripheral device pairing software utility 168 may require the user to perform multiple types of user input via the wireless keyboard 178, or may require entry of one or more passcodes or pairing credentials via the wireless keyboard 178.

In an embodiment where the information handling system 100 does not operate a seamless Bluetooth® peripheral device pairing software utility 168, such as when the pre-loaded OEM pairing application system has not been pre-loaded onto the information handling system 100 at the original equipment manufacturer (OEM), the information handling system 100 hardware processor 102 may execute code instructions of a wireless HID-pairing pre-OOBE system 171 to pair a wireless mouse 156 or wireless keyboard 178 to provide necessary user input for the remaining portions of the standard OOBE process 184. Operating system providers, such as Microsoft®, for example, allow for provision of customized images for display to the user via the video display device 146 prior to execution of the standard OOBE system 184 that instruct the user to perform various steps for pairing with any one of a plurality of possible wireless HIDs, such as 156 or 178. However, these customized images may not be specific to the wireless mouse 156 or the wireless keyboard 178 identified within the GCF.xml file described above. As such, the process for pairing described within these OEM customized images may be more general and may require a plurality of steps that the user can try, based on which type of wireless mouse 156 or wireless keyboard 178 the user wishes to pair.

The remaining portions of the standard OOBE process of OOBE system 184, or the OEM customized OOBE system 170 in some embodiments, may then be completed using the paired wireless peripheral HID(s), such as 156 and 178 to provide any necessary user input. Such a standard OOBE process of OOBE system 184 or the OEM customized OOBE system 170 in an embodiment may include instructions for the user to select a language, a time zone or region in which the information handling system 100 is being set up, or instructions for connecting the information handling system 100 to the network 138, for example. It is contemplated that the standard OOBE process of OOBE system 184 or the OEM customized OOBE system 170 may perform any steps necessary and gather any user input necessary, via the wireless mouse 156 and wireless keyboard 178, or wireless video display device 146 or wireless trackpad 154, to initialize the operating system 118.

The operating system 118 for the information handling system 100 in an embodiment may then initialize, following completion of the standard OOBE process of OOBE system 184 or the OEM customized OOBE system 170. In an embodiment, the wireless peripheral HID(s), such as the wireless mouse 156, wireless keyboard 178, or wireless video display device 146 or trackpad 154 that were previously paired with the information handling system 100 may continue to communicate with information handling system 100 via those previously established wireless links, negating the need for further pairing with those previously paired wireless HIDs.

When referred to as a "system," a "device," a "module," a "controller," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCM-CIA) card, or other such expansion card), or a system (such as a motherboard, a system-on-a-chip (SoC), or a stand-alone device). The system, device, controller, or module can include hardware processing resources executing software, including firmware embedded at a device, such as an Intel® brand processor, AMD® brand processors, Qualcomm® brand processors, or other processors and chipsets, or other such hardware device capable of operating a relevant soft-ware environment of the information handling system. The system, device, controller, or module can also include a combination of the foregoing examples of hardware or hardware executing software or firmware. Note that an information handling system can include an integrated cir-cuit or a board-level product having portions thereof that can also be any combination of hardware and hardware execut-ing software. Devices, modules, hardware resources, or hardware controllers that are in communication with one another need not be in continuous communication with each other, unless expressly specified otherwise. In addition, devices, modules, hardware resources, and hardware con-trollers that are in communication with one another can communicate directly or indirectly through one or more intermediaries.

Figure 2:
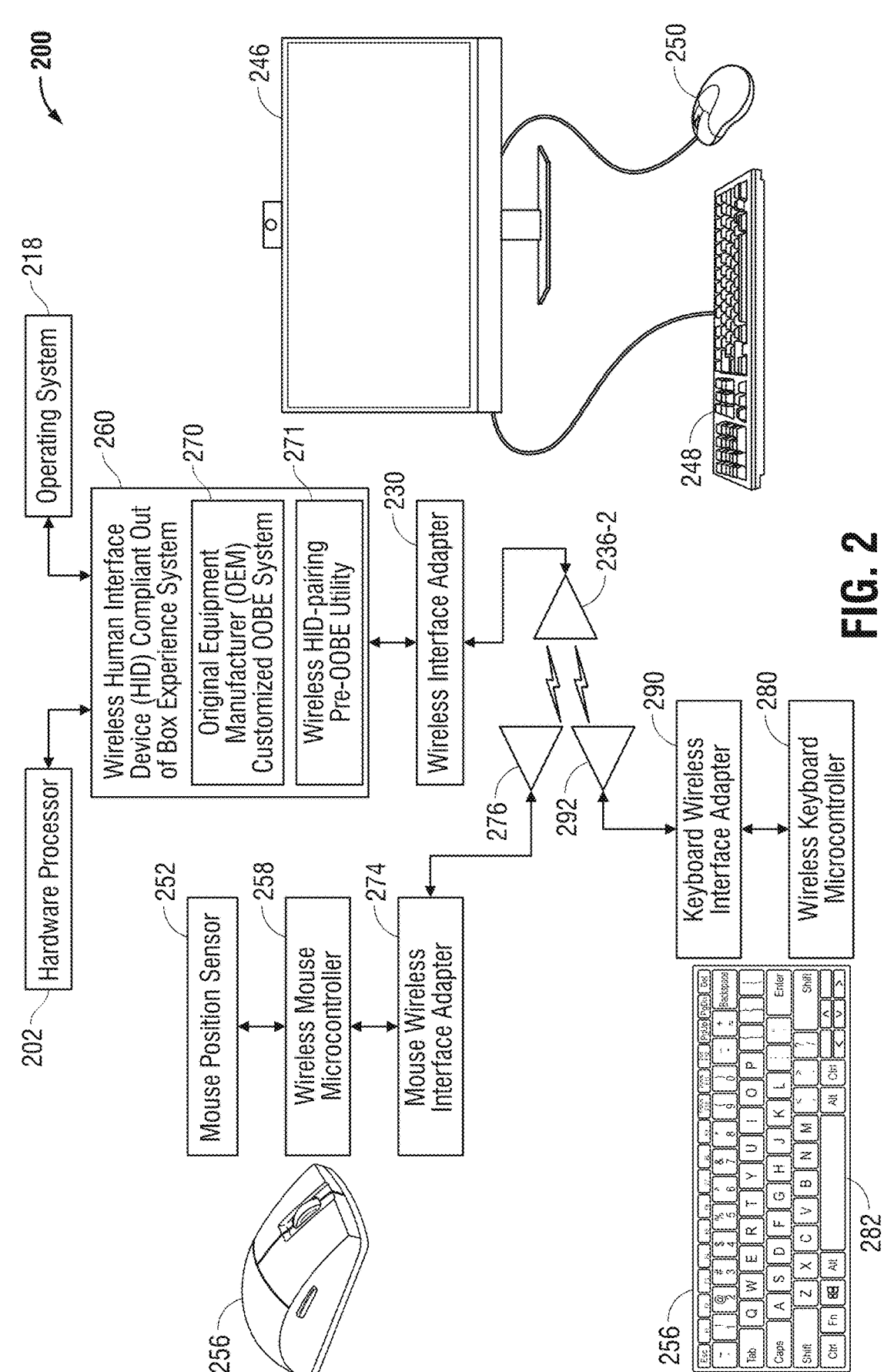
FIG. 2 is a block diagram illustrating a plurality of wireless peripheral HIDs paired to an information handling system for providing user input necessary to complete a standard OOBE process for initializing an operating system for the information handling system according to an embodiment of the present disclosure.

FIG. 2 is a block diagram illustrating a plurality of wireless peripheral human interface devices (HIDs) paired to an information handling system prior to execution of a standard out of box experience (OOBE) process for provid-ing user input necessary to complete the standard OOBE process for initializing an operating system for setup of the information handling system. As described herein, informa-tion handling systems, such as 200 may be operatively coupled to one or more peripheral HIDs, such as 256 or 278, to allow the user to interact with the information handling system 200. In existing systems, pairing of the wireless peripheral HIDs 256 and 278 to the information handling system 200 to establish wireless communication between the, usually occurs after the information handling system 200 operating system 218 has been initialized through an initial setup or out-of-box experience (OOBE) process in which the user provides various types of user input through wired peripheral human interface devices (HIDs), such as 256 and 278 necessary to initialize the operating system 218 in the proper format (e.g., language, time zone, network setup, etc.).

Often, desktop computers or all-in-one computers, such as 200 require purchase of a peripheral HID, such as wired keyboard 248 or wired mouse 250 capable of wired con-nection (e.g., via Universal Serial Bus (USB)) to the desktop or all-in-one information handling system 200 in order to perform this process. However, the user may not wish to continue use of these wired peripheral HIDs, such as 248 and 250 following that process. In fact, such wired periph-eral HIDs 248 and 250 are often returned or discarded immediately following setup of the information handling system 200 in preference for a wireless peripheral HID, such as 256 or 278 that may have even been purchased simulta-neously with the desktop or all-in-one information handling system 200.

The wireless HID compliant OOBE system 260 in an embodiment may provide a user interface for pairing the wireless peripheral HID(s) 256 and 278 with the information handling system 200 prior to or at the start of execution of the standard OOBE process to initialize the operating system 218, depending on whether an OEM pairing system appli-cation is detected or other pairing system operation is to be used. For example, when an OEM pairing system applica-tion has been loaded to be used as a Bluetooth® pairing utility, then an OEM customized OOBE system 270 may be used to overlay instructions and conduct pairing from an OEM loaded system that may operate as a Win32 type file and may have additional pairing methods or features. When an OEM pairing system application is not available, pairing may be orchestrated using a wireless HID-pairing pre-OOBE utility 271 to insert display images prior for available pairing methods prior to start up of the OOBE process in an embodiment.

Upon startup of a newly purchased or newly assigned information handling system 200 (e.g., by an enterprise information technology decision maker (ITDM)) within range of one or more Bluetooth® peripheral HIDs, such as 256 and 278, a stored information handling system chassis type indicator file stored in memory may be referenced in order to detect that the information handling system 200 is a desktop or an all-in-one system, as described in greater detail above with respect to FIG. 1. This may indicate that the information handling system does not have an incorporated keyboard and touchpad common to laptops and tablets, and may require pairing or wired connection to such a keyboard (e.g., 278 or 248) and mouse (e.g., 256 or 250) for user input during the initial setup of the information handling system 200 through an OOBE process.

A stored peripheral device Extensive Markup Language (XML) content file (GCF.xml) for peripheral HIDs stored in memory and that may be commonly owned by or assigned to the information handling system 200 owner. The stored peripheral device XML content file (GCF.xml) for peripheral HIDs types that may be owned or available may be referenced by the hardware processor 202 of the information handling system 200 executing code instructions of the wireless HID compliant OOBE system 260 to identify one or more capabilities, such as Bluetooth® and other capabilities of the wireless mouse 256 or wireless keyboard 278 to be paired with the information handling system 200. Thus, the wireless mouse 256 or wireless keyboard 278 type to be paired may be identified to provide the necessary input for completion of the initial OOBE process to setup the operating system 218 and information handling system 200. The hardware processor 202 may execute code instructions of the wireless HID compliant OOBE system 260 in an embodiment to determine that a peripheral HID, such as 256 or 278 listed in the peripheral device GCF.xml file supports Bluetooth® or other wireless communication via the wireless interface adapter 230, which may indicate that such a peripheral HID 256 or 278 needs to pair with the information handling system 200 in order to perform the OOBE process to initialize the operating system 218.

The hardware processor 202 may execute code instructions 214 to pair a wireless mouse or wireless keyboard that can be used to provide necessary user input for the remaining portions of the standard OOBE process, as also described in greater detail above with respect to FIG. 1. In an embodiment, a Bluetooth® wireless mouse 256 within Bluetooth® range of the information handling system 200 may be paired to the information handling system 200. In some embodiments, an OEM pairing system application loaded by a particular OEM may provide added features or greater simplicity for pairing than standard pairing procedures available to the information handling system 200 via BIOS or an operating system 218. In an example embodiment, an OEM pairing system application may provide for pairing with a zero-click method in which the manufacturer or ITDM has preloaded BT pairing credentials via provisioning the peripheral HID as well as the information handling system 200 at a factory or an enterprise. This may then generate pre-pairing codes that are pre-loaded or generated using seed values and a hash algorithm and which may be securely exchanged or verified that pairing passcodes match. For example, exchange of a seed value, passcode, or other verification indicator may be exchanged as pairing credentials via encryption or in a secure communication, such as via an extended directed GATT BLE communication. In another embodiment, one click method may be used such as a single gesture may be used such as a gesture to move the wireless mouse 256 or accept a click on the wireless mouse or a key on a wireless keyboard 278 according to a displayed instruction on a video display device 246. This may cause a mouse position sensor 252 to detect such instructed movement of the mouse 278, the wireless mouse controller 258 to detect a button click, and the wireless mouse microcontroller 258 may instruct the mouse wireless interface adapter 274 to transmit notification of such movement or button click to the information handling system 200, via the wireless network interface adapter 230.

Additionally, a Bluetooth® wireless keyboard 278 within Bluetooth® range of the information handling system 200 may be paired to the information handling system 200 in an embodiment. In an example embodiment, an OEM pairing system application may provide for pairing with a zero-click method in which the manufacturer or ITDM has preloaded BT pairing credentials via provisioning the peripheral HID as well as the information handling system 200 at a factory or an enterprise. This may then generate pre-pairing codes that are pre-loaded or generated using seed values and a hash algorithm and which may be securely exchanged or verified that pairing passcodes match. For example, exchange of a seed value, passcode, or other verification indicator may be exchanged as pairing credentials via encryption or in a secure communication, such as via an extended directed GATT BLE communication. In other embodiments, the OEM pairing system application may utilize a process that may include a one-click method in which the user presses a single, specific key 282 of the keyboard 278 according to a displayed instruction on the video display device 246. This may cause the keyboard microcontroller 280 to register such an instructed keystroke and transmit notification of that keystroke to the wireless interface adapter 230 via the keyboard network interface adapter 290.

The remaining portions of the standard OOBE process may then be executed in an embodiment, using the paired wireless peripheral HID(s) 256 and 278 to provide any necessary user input to the OOBE system. The operating system 218 for the information handling system 200 in an embodiment may then initialize, sometimes following one or more reboot processes. In an embodiment, the wireless peripheral HID(s) 236 and 278 that were previously paired with the information handling system 200 may continue to communicate with information handling system 200 via those previously established wireless links, negating the need for further pairing. In such a way, the one or more wireless peripheral HIDs 256 and 278 may be paired to the information handling system 200 prior to or at the start of execution of a standard OOBE process in order to allow for such wireless peripheral HIDs 256 and 278 to provide user input necessary to complete the standard OOBE process, in such a way as to further allow for continued wireless connection of the paired wireless peripheral HIDs 256 and 278 following completion of the standard OOBE process and initialization of the information handling system 200 operating system 218.

Figure 3:
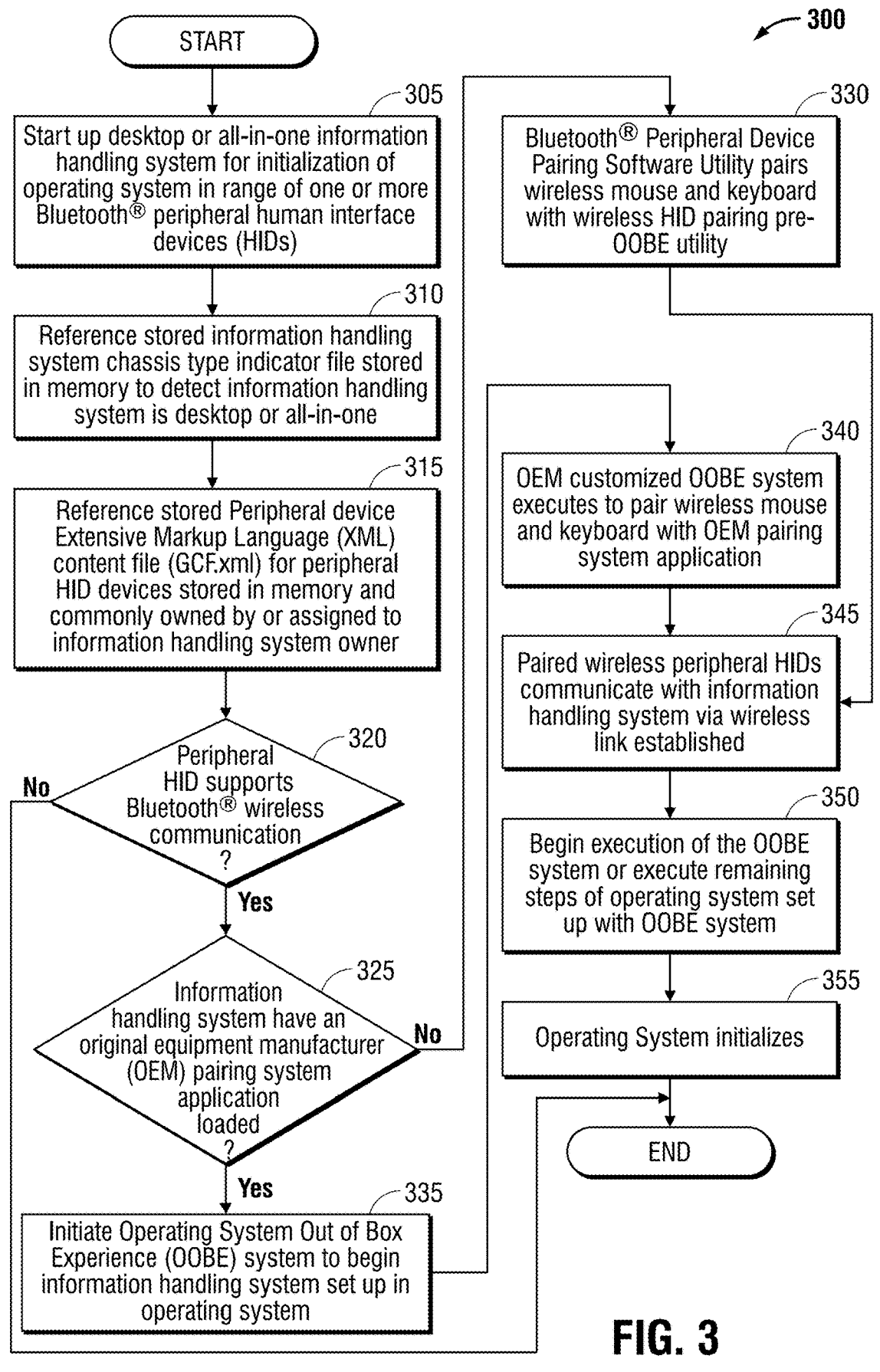
FIG. 3 is a flowchart showing a method of pairing a wireless peripheral HID to an information handling system during or prior to execution of a standard OOBE process to provide the wireless peripheral HID for input to execute the standard OOBE process according to another embodiment of the present disclosure.

FIG. 3 is a flowchart showing a method 300 of pairing one or more wireless peripheral human interface devices (HIDs)

to an information handling system prior to or at the beginning of execution of a standard out of box experience (OOBE) process for initializing the operating system at that information handling system and setting up the information handling system according to another embodiment of the present disclosure. As described herein, a wireless HID compliant OOBE system and a Bluetooth® peripheral device pairing software utility in an embodiment may provide a user interface for pairing one or more wireless peripheral HID(s) with an information handling system and conduct pairing via various pairing methods depending upon whether an OEM pairing system application has been loaded to the information handling system or not. Pairing is conducted prior to or at the beginning of execution of the standard OOBE process, so that those wireless peripheral HIDs may be paired and operational to be used to provide necessary user input during the standard OOBE process to initialize the information handling system operating system.

At block 305, a user may start up a newly purchased or newly assigned desktop or all-in-one information handling system for initialization in an embodiment of its operating system in range of one or more Bluetooth® peripheral human interface devices (HIDs). For example, in an embodiment described with reference to FIG. 1, a user of the information handling system 100 may start up a newly purchased or newly assigned desktop or all-in-one information handling system 100 for initialization of its operating system 118. Such a startup may be performed within range of one or more Bluetooth® peripheral human interface devices (HIDs), such as the wireless mouse 156 or wireless keyboard 178.

In an embodiment at block 310, a stored information handling system chassis type indicator file stored in memory may be referenced in order to detect if the information handling system is a desktop or an all-in-one system. For example, a stored information handling system chassis type indicator file stored in memory 108, 110, or 122 may be referenced in order to detect if the information handling system 100 is a desktop or an all-in-one system. This may indicate that the information handling system 100 does not have an incorporated keyboard (not shown) and touchpad (not shown) common to laptops and tablets, and may require wireless pairing or wired connection to such a keyboard (e.g., 178 or 148) and mouse (e.g., 156 or 150) or touchpad (e.g., 154) for user input during the initial setup of the information handling system 100 through an OOBE process executed by the OOBE system 184.

At block 315, a stored peripheral device XML content file (GCF.xml) for peripheral HIDs stored in memory and commonly owned by or assigned to the information handling system owner may be referenced to identify one or more wireless peripheral device types available and capabilities such as Bluetooth® or BLE operations supported by those wireless peripheral HIDs. For example, referring to FIG. 1, a stored GCF.xml for peripheral HIDs may be stored in memory 108, 110, or 122 and commonly owned by or assigned to the information handling system 100 owner. This GCF.xml file may be referenced during execution by the hardware processor 102 of the code instructions of the wireless HID compliant out of box experience system 160 to identify one or more peripheral devices, such as 156, 178, 146, 148, 150, or 154 owned by the same user that owns the information handling system 100. In an embodiment, common ownership, such as from a customer order file, may indicate that any wireless peripheral devices, such as 156 or 178 listed within the GCF.xml file are trusted devices that may be paired to the information handling system 100 using minimal user input in that pairing passcodes may be already uploaded or capabilities to generate the same with seed values may be available.

It may be determined at block 320 in an embodiment whether a peripheral HID listed in the peripheral device GCF.xml file supports Bluetooth® wireless communication. For example in FIG. 1, the hardware processor 102 may execute code instructions of the wireless HID compliant out of box experience system 160 to determine that, of the peripheral devices 156, 178, 146, 148, 150, and 154 listed within the GCF.xml file described directly above, peripheral devices 156 and 178 are wireless peripheral devices capable of communicating with the information handling system 100 via Bluetooth® or BLE wireless links. Further, it may be referenced from stored information handling system configuration files stored in memory that the desktop or all-in-one information handling system supports Bluetooth® or BLE as well in some embodiments. This Bluetooth® or BLE capabilities on both sides may indicate that such a peripheral HID, such as wireless mouse 156 or wireless keyboard 178, may be paired with the information handling system 100 as a first step, and used to conduct the standard OOBE process of OOBE system 184 to initialize the operating system 118 and set up the information handling system 100. If no peripheral HIDs listed within the peripheral device GCF.xml file support Bluetooth® wireless communication, this may indicate no such need to pair with the information handling system in order to perform the out of box experience process to initialize the operating system, and a wired peripheral HID needs to be used. With no Bluetooth® or BLE capability at 320, the method for pairing one or more wireless peripheral HIDs to an information handling system prior to or at the beginning of execution of a standard OOBE process for initializing the operating system at that information handling system may then end.

At block 325 in an embodiment, it may be determined whether the information handling system has an OEM pairing system application as its Bluetooth® peripheral device pairing software utility loaded onto the information handling system. In some embodiments, the OEM pairing system application may provide additional features and improvements to the Bluetooth® pairing process to seamlessly pair specific Bluetooth® peripheral HIDs known to have common ownership or assignment with the information handling system to a single user with minimal user input required. For example, in an embodiment and in reference to FIG. 1, the hardware processor 102 may execute code instructions of a wireless HID compliant out of box experience system 160 that is an OEM customized OOBE system when an OEM pairing system application is detected on the information handling system 100 as the Bluetooth® peripheral device pairing software utility.

In an embodiment, the OEM customized OOBE system may provide displayed instructions for additional features or simpler, more minimal requirement for pairing input provided with the OEM pairing system application that may be referred to as a seamless Bluetooth® peripheral device pairing software utility to seamlessly pair specific Bluetooth® peripheral HIDs, such as 156 or 178 known to have common ownership or assignment with the information handling system 100 to a single user with minimal user input required. Such a seamless Bluetooth® peripheral device pairing software utility, such as the Dell Pair® utility, may provide minimal user input required such that it supports pairing automatically with one touch or zero touch to trusted Bluetooth devices, such as 156 and 178 that are commonly owned with the information handling system 100 and may have preloaded Bluetooth pairing credentials on both sides. Further discussion of this seamless Bluetooth® peripheral device pairing software utility is below in FIG. 4.

When no OEM pairing system application is determined to be loaded on the information handling system, the method 300 proceeds to block 330 where the Bluetooth® peripheral device pairing software utility 168 may automatically prompt pairing with wireless HIDs such as wireless mouse 156 or wireless keyboard 178 before commencement of execution of the OOBE process of the OOBE system 184 for setting up the operating system 118 and the information handling system 100. In this embodiment, when no OEM pairing system application is determined to be loaded on the information handling system, the Bluetooth® peripheral device pairing software utility will begin pre-pairing communications with wireless HIDs such as wireless mouse or wireless keyboard according to available Bluetooth pairing methods available. The hardware processor will execute code instructions of the wireless HID pairing pre-OOBE utility to provide pairing instruction display images on a display screen of the information handling system to execute the pairing process available to the information handling system with the wireless HIDs. These pairing instruction display images may be inserted by the hardware processor of the information handling system and displayed before the OOBE process begins and the OOBE system executes to set up the operating system in some embodiments and may be stored in the full flash update (FFU) image or other accessible location for an OOBE.xml set up file. The pairing instruction display images will instruct pairing procedures with the wireless HIDs that may be sub-optimal and require more user inputs, such as entry of pairing codes, additional gestures or keystrokes, pairing button actuation routines, or the like in some embodiments.

Operating system providers, such as Microsoft®, for example, allow for OEMs to provide customized images for display to the user via the video display device 146 prior to execution of the standard OOBE system 184 that instruct the user to perform various steps for pairing with any one of a plurality of possible wireless HIDs, such as 156 or 178. However, these customized images may not be specific to the wireless mouse 156 or the wireless keyboard 178 identified within the GCF.xml file described above with respect to block 315. As such, the process for pairing described within these OEM customized images may be more general and may require a plurality of steps that the user can try, based on which type of wireless mouse 156 or wireless keyboard 178 the user wishes to pair. Further, in some embodiments, the pairing processes may not be as minimal in requiring user input to pair as an OEM pairing system application. This may be because, for example, the manufacturer may have pre-loaded Bluetooth® pairing credentials or seed values and established data for a trust relationship due to common ownership or other identification for use with an OEM pairing system application. Steps for pairing may be reduced with pre-loaded pairing credentials, encryption keys and systems, or trust authorization for establishing secure pre-pairing communications.

Proceeding to block 345, the wireless HID or wireless HIDs, such as a wireless mouse and a wireless keyboard, are paired and operate to provide HID input data from a use to the desktop or all-in-one information handling system.

Returning to block 325, where the OEM pairing system application is determined to be loaded on the information handling system, the method 300 proceeds to block 335 where the hardware processor commences execution of the OOBE system to begin operating system and information handling system setup. In a particular embodiment, the commencement of execution of code instructions for the OOBE system is an OEM customized OOBE system that include a file access to generate OEM specific pairing instruction display images that may be overlayed on top of the displayed pages of the OOBE system. The OEM pairing system application as the Bluetooth® peripheral device pairing software utility will begin executing in embodiments herein while the OOBE system waits to continue the OOBE process steps. Since the OEM pairing system application may be a seamless Bluetooth® peripheral device pairing software utility requiring minimal touch and discussed further below in FIG. 4, the pairing instruction display images should be minimal as well in embodiments herein.

The execution of the OEM pairing system application commences any pre-pairing communications, such as with GATT BLE messaging, and then commences exchange or verification or pairing credentials between the wireless HIDs and the information handling system using the methods and systems of the OEM pairing system application. Again, the OEM pairing system application may utilize the seamless Bluetooth® peripheral device pairing software utility with minimal user touch required and described below if FIG. 4. This seamless Bluetooth® peripheral device pairing software utility may be a feature of the OEM pairing system application that has an advantage over other, standard pairing techniques. For example, the OEM pairing system application may utilize the trust determination and pre-loading of pairing passcode credentials, seed values or other techniques to expedite the Bluetooth® pairing with zero touch or one touch techniques that may rely on these pre-loaded pairing credentials and trust verification.

The method 300 may then proceed to block 345, where the wireless HID or wireless HIDs, such as a wireless mouse and a wireless keyboard, are paired and operate to provide HID input data from a use to the desktop or all-in-one information handling system.

At block 350, the hardware processor of the information handling system may commence execution of the OOBE system to begin the standard OOBE process to set up the operating system and the information handling system. This will occur at block 350 when the OOBE system has not been initiated yet before pairing of the HID devices, such as when a wireless HID pairing pre-OOBE utility assisted a user to use standard pairing techniques of the Bluetooth® peripheral device pairing software utility to conduct pairing, such as when having no established trust relationship like identified co-ownership and pre-loaded pairing credentials in some embodiments. In another embodiment, at block 350, the remaining portions of the standard OOBE process may continue to be executed when the OEM customized OOBE system began execution and provided instructions for pairing using the OEM pairing system application as described herein and below in FIG. 4. Thus, in both instances at block 350, the execution of steps and interfacing with the standard OOBE process to initialize and set up the operating system and set up the information handling system may be conducted using the paired wireless peripheral HID(s) that are operational to provide any necessary user input. For example, this may occur after the wireless peripheral HID(s) have been paired to the information handling system via either the OEM customized OOBE system or via the wireless HID pairing pre-OOBE utility. More specifically, the standard OOBE process 184 may then be completed, in an embodiment, using the paired wireless peripheral HID(s), such as 156 and 178 to provide any necessary user input. Such a standard OOBE process 184 in an embodiment may include instructions for the user to select a language, a time zone or region in which the information handling system 100 is being set up, or instructions for connecting the information handling system 100 to the network 138, for example.

At block 355, the operating system for the information handling system in an embodiment may initialize. This may occur immediately following completion of the OOBE process and possibly following one or more reboots of the information handling system. In an embodiment at block 355, the wireless peripheral HID(s) that were previously paired with the information handling system at either block 330 or 340 may continue to communicate with information handling system via those previously established wireless links, negating the need for further pairing. For example, the wireless peripheral HID(s), such as the wireless mouse 156, wireless keyboard 178, or wireless video display device 146 or trackpad 154 that were previously paired with the information handling system 100 may continue to communicate with information handling system 100 via those previously established wireless links, negating the need for further pairing with those previously paired wireless HIDs. In such a way, the seamless Bluetooth® peripheral device pairing software utility and the wireless HID compliant OOBE system in an embodiment may pair one or more wireless peripheral HIDs to the information handling system prior to execution of a standard OOBE process for initializing the operating system at that information handling system, in order to allow for such wireless peripheral HIDs to provide user input necessary to complete the standard OOBE process. This may be completed in such a way as to further allow for continued wireless connection of the paired wireless peripheral HIDs following completion of the standard OOBE process and initialization of the information handling system operating system. The method for pairing one or more wireless peripheral HIDs to an information handling system prior to execution of a standard OOBE process for initializing the operating system at that information handling system may then end.

Figure 4:
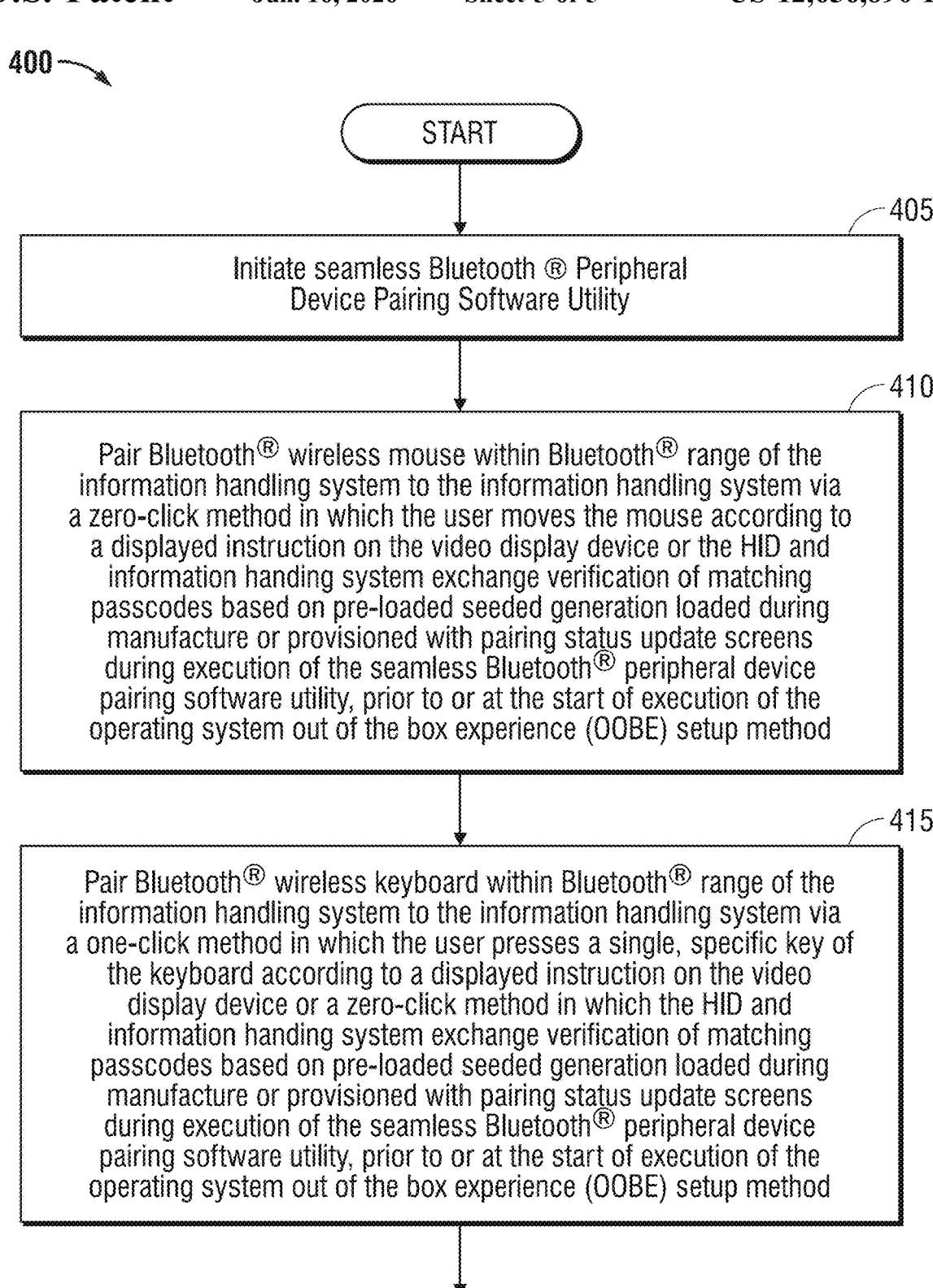
FIG. 4 is a flowchart showing a method of reducing user input required to pair one or more wireless peripheral HIDs to an information handling system prior to execution of a standard OOBE process according to another embodiment of the present disclosure.

FIG. 4 is a flowchart showing a method 400 of reducing user input required to pair one or more wireless peripheral human interface devices (HIDs) to an information handling system prior to execution of a standard out of box experience (OOBE) process for initializing the operating system at that information handling system or in an overlay after a startup of the OOBE process for initializing the operation system according to various embodiments of the present disclosure. As described herein, where the desktop or all-in-one information handling system is capable of operating a seamless Bluetooth® peripheral device pairing software utility in some embodiments.

In some embodiments herein, the seamless Bluetooth® peripheral device pairing software utility may pair a wireless mouse or wireless keyboard using minimal user input so that the HIDs can be used to provide necessary user input for standard OOBE process or the remaining portions of the standard OOBE process. The seamless Bluetooth® peripheral device pairing software utility may operate in connection with a OEM customized OOBE system to provide pairing procedure instructions automatically displayed to the user at the start of the OOBE process to set up the operating system. In some embodiments, the minimal user input pairing processes used may be a feature unique to an OEM pairing application system installed on the information handling system and executing, for example from a Win32 file, to provide functionality that is more streamlined than standard Bluetooth® pairing functionality. In such a way, the seamless Bluetooth® peripheral device pairing software utility may pair one or more wireless peripheral HIDs using minimal user pairing input to a desktop or all-in-one information handling system, prior to execution of a standard OOBE process or after initial commencement of the standard OOBE, in order to allow for such wireless peripheral HIDs to provide user input necessary to complete the standard OOBE process. A different type of Bluetooth® peripheral device pairing software utility may require additional standard pairing techniques that may not be as minimal for user input, for example, when no OEM pairing application system has been detected as installed according to embodiments herein.

At block 405, the seamless Bluetooth® peripheral device pairing software utility may be initiated at boot up, but prior to initiation or at the beginning of the standard out of box experience (OOBE) process software for initializing the operating system during setup of the desktop or all-in-one information handling system according to embodiments. For example, in an embodiment described with respect to FIG. 1 and at block 330 of FIG. 3, where the information handling system 100 is capable of operating a seamless Bluetooth® peripheral device pairing software utility 168, the hardware processor 102 of the information handling system 100 may execute code instructions of the seamless Bluetooth® peripheral device pairing software utility 168 to pair the wireless mouse 156 or wireless keyboard 178 to be used to provide necessary user input for completing the remaining portions of the standard OOBE process 184 and setting up the operating system during setup of the desktop or all-in-one information handling system. The seamless Bluetooth® peripheral device pairing software utility 168 may initiate pairing, using customized OOBE process images that step the user through the process of pairing the specific wireless peripheral HIDs, such as 156 and 178 identified within the GCF.xml file described at block 315 of FIG. 3.

In an embodiment at block 410, a Bluetooth® wireless mouse within Bluetooth® range of the information handling system may be paired to the information handling system. Such a pairing may include a zero-click method in which the user moves the mouse in a gesture according to a displayed gesture instruction on the video display device during execution of the seamless Bluetooth® peripheral device pairing software utility. In another embodiment, the pairing passcodes may have been pre-loaded at the manufacturer and providing for secure BLE GATT transmission of a seed value shared between the desktop or all-in-one information handling system and the HID allows execution of a hash algorithm to provided confirmation of the pairing upon start up. In some embodiments, this generated or even a pre-loaded pairing passcode may be provisioned securely to the desktop or all-in-one information handling system and the passcode may be encrypted and transmitted securely for comparison and verification, such as via a GATT communication. A display window may provide a user updates as to the status of pairing the HID with such a zero click pairing option when available and pre-loaded at a manufacturer. As described herein, the pairing gesture instruction or status of pairing window would require a display screen available and would be inserted as an overlay display after commencement of execution of the windows OOBE process software when an OEM custom pairing application is detected for a OOBE or may be generated as an image, such as a full flash update image, as inserted at the beginning and as part of the OOBE process software execution for setting up the operating system.

A Bluetooth® wireless mouse within Bluetooth® range of the information handling system may then be paired to the information handling system using a zero-click method in which the user moves the mouse according to a displayed gesture instruction on the video display device during execution of the seamless Bluetooth® peripheral device pairing software utility. For example, a Bluetooth® wireless mouse 156 within Bluetooth® range of the information handling system 100 may be paired to the information handling system 100 using such a seamless Bluetooth® peripheral device pairing software utility 168. Such a pairing may include a zero-click method in which the user moves the mouse 156 according to a displayed instruction on the video display device 146 during execution of the seamless Bluetooth® peripheral device pairing software utility 168. Alternatively, the seeded pairing passcode generation system on both the desktop or all-in-one information handling system and the HID device may further provide a zero touch pairing by parallel generation of matching pairing passcodes. This curtailed or minimal user input method may be used specifically due to the fact that the hardware processor 102 executing code instructions of the wireless HID compliant OOBE system 160 has identified the wireless mouse 156 as a trusted device through reference to the GCF.xml file described above at block 315 of FIG. 3.

At block 415 in an embodiment, a Bluetooth® wireless keyboard within Bluetooth® range of the information handling system may be paired to the information handling system. This pairing process may include via a one-click method in which the user presses a single, specific key of the keyboard according to a displayed instruction on the video display device during execution of the seamless Bluetooth® peripheral device pairing software utility or via a zero click pairing with a pre-loaded pairing passcode or hash algorithm that may securely generate a matching pairing passcode with an agreed seed value as described above. Additionally, a Bluetooth® wireless keyboard within Bluetooth® range of the information handling system may be paired to the information handling system in an embodiment using a one-click pairing method in which the user presses a single, specific key of the keyboard according to a displayed instruction on the video display device or views update screens of pairing progress of a zero-click pairing method during execution of the seamless Bluetooth® peripheral device pairing software utility. For example, in an embodiment, a Bluetooth® wireless keyboard 178 within Bluetooth® range of the information handling system 100 may be paired to the information handling system 100 using the seamless Bluetooth® peripheral device pairing software utility 168. This pairing process may include a one-click method in which the user presses a single, specific key of the keyboard 178 according to a displayed instruction on the video display device 146 or the zero click pairing method using pre-loaded hash algorithms for seeded generation of matching pairing passcodes during execution of the seamless Bluetooth® peripheral device pairing software utility 168. This curtailed or minimal user input method may be used specifically due to the fact that the hardware processor 102 executing code instructions of the wireless HID compliant OOBE system 160 has identified the wireless keyboard 178 as a trusted device through reference to the GCF.xml file described above at block 315 of FIG. 3. In such a way, the seamless Bluetooth® peripheral device pairing software utility may pair one or more wireless peripheral HIDs using minimal user pairing input, prior to execution of a standard OOBE process, in order to allow for such wireless peripheral HIDs to provide user input necessary to complete the standard OOBE process. The method for reducing user input required to pair one or more wireless peripheral HIDs to an information handling system prior to execution of a standard OOBE process for initializing the operating system at that information handling system may then end.

The blocks of the flow diagrams of FIGS. 3 and 4 or steps and aspects of the operation of the embodiments herein and discussed herein need not be performed in any given or specified order. It is contemplated that additional blocks, steps, or functions may be added, some blocks, steps or functions may not be performed, blocks, steps, or functions may occur contemporaneously, and blocks, steps, or functions from one flow diagram may be performed within another flow diagram.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The subject matter described herein is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents and shall not be restricted or limited by the foregoing detailed description.

What is claimed is:

1. An information handling system executing code instruction of a wireless human interface device (HID) compliant out of box experience (OOBE) system for operably coupling to a wireless peripheral HID comprising:

a hardware processor;

a hardware storage device for storing a chassis type for the information handling system;

the hardware processor to execute code instructions of the wireless HID compliant OOBE system to determine that the stored chassis type for the information handling system indicates the information handling system is a desktop or an all-in-one system;

the hardware processor to execute code instructions of the wireless HID compliant OOBE system to determine if a wireless peripheral device pairing software utility is an original equipment manufacturer (OEM) pairing system application pre-loaded on the information handling system upon manufacture;

the hardware processor to execute code instructions to pair the one or more peripheral HIDs to the information handling system and establish wireless links with the one or more peripheral HIDs before executing code instructions of an OOBE system process to set up an operating system on the information handling system via a wireless HID pre-OOBE utility when there is not the OEM pairing system application pre-loaded on the information handling system;

the hardware processor to commence executing code instructions of the OOBE system process to set up the operating system on the information handling system via an OEM customized OOBE system process when there is the OEM pairing system application pre-loaded on the information handling system and then pair the one or more peripheral HIDs to the information handling system and establish wireless links at the beginning of the OEM customized OOBE system process; and the hardware processor to receive user input received from the established wireless links with each of the one or more peripheral HIDs paired to the information handling system to complete execution of code instruction for the OOBE system process to initialize and set up the operating system for the information handling system.

2. The information handling system of claim 1, wherein the wireless links are established using the Bluetooth® communication protocol.

3. The information handling system of claim 1, wherein the wireless links are established using the Bluetooth® low energy (BLE) communication protocol.

4. The information handling system of claim 1, wherein the one or more peripheral HIDs includes a wireless mouse.

5. The information handling system of claim 1 further comprising:

the hardware processor to execute code instructions of the wireless HID compliant OOBE system to determine that a stored XML content file on the information handling system indicates the one or more peripheral HIDs are wireless peripheral HIDs having a common ownership with the information handling system to assist in pairing procedures of the one or more peripheral HIDs with the information handling system.

6. The information handling system of claim 1 further comprising:

the hardware processor to execute code instructions of the wireless HID compliant OOBE system to determine that the OEM pairing system application includes pre-loaded pairing credentials at the one or more wireless peripheral HIDs and provisioned to the information handling system to establish the wireless links with each of the one or more peripheral HIDs using minimal user input during the pairing process.

7. The wireless HID compliant OOBE system of claim 1 further comprising:

the hardware processor to overlay pairing instructions display screens over the OOBE system process to set up the operating system via the OEM customized OOBE system process and execute the OEM pairing application system in coordination with the overlayed pairing instruction display screen to operably couple with the one or more peripheral HIDs via the wireless links before completing the OOBE system process to set up the operating system.

8. The information handling system of claim 7 further comprising:

the hardware processor to insert second overlayed pairing instruction display screen with the wireless HID pre-OOBE utility prior to executing the OOBE system process to set up the operating system and execute the pairing of the one or more peripheral HIDs in coordination with the second pairing instruction display screen when the OEM pairing application system is not present.

9. A method of pairing a wireless peripheral human interface device (HID) with an information handling system for providing user input during execution of an out of box experience (OOBE) system for initializing an operating system of the information handling system comprising:

executing code instructions of the wireless HID compliant OOBE system, via a hardware processor, to determine a stored chassis type indicating the information handling system is a desktop or an all-in-one system;

executing code instructions of the wireless HID compliant OOBE system, via the hardware processor, to determine a stored peripheral device extensive markup language (XML) content file indicates one or more peripheral HIDs are wireless peripheral HIDs having common ownership with the information handling system;

executing code instructions, via the hardware processor, of the wireless HID compliant OOBE system to determine if a wireless peripheral device pairing software utility is an original equipment manufacturer (OEM) pairing system application pre-loaded on the information handling system upon manufacture and, if so, to commence executing code instructions of the OOBE system process to set up the operating system on the information handling system via an OEM customized OOBE system process and to pair the one or more peripheral HIDs to the information handling system and establish wireless links at the beginning of the OEM customized OOBE system process using the OEM pairing system application with pairing instructions display screens overlayed on the OOBE system process to coordinate pairing;

executing code instruction, via the hardware processor, to pair the one or more peripheral HIDs to the information handling system and establish wireless links with the one or more peripheral HIDs before executing code instructions of an OOBE system process to set up an operating system on the information handling system via a wireless HID pre-OOBE utility when the OEM pairing system application is not pre-loaded on the information handling system; and receiving user input received from the established wireless links with each of the one or more peripheral HIDs paired to the information handling system to complete execution of code instruction for the OOBE system process to initialize and set up the operating system for the information handling system.

10. The method of claim 9 further comprising:

executing code instructions of the wireless HID pre-OOBE utility to insert a second overlayed pairing instruction display screen prior to executing the OOBE system process to set up the operating system and execute the pairing of the one or more peripheral HIDs in coordination with the second pairing instruction display screen via a second type of wireless peripheral device pairing software utility when the OEM pairing application system is not present.

11. The method of claim 9, wherein the wireless links are established using the Bluetooth® communication protocol.

12. The method of claim 9, wherein the wireless links are established using the Bluetooth® low energy (BLE) communication protocol.

13. The method of claim 9 further comprising:

executing code instructions, via the hardware processor, of the OEM pairing application system to pair a wireless mouse to the information handling system using a gesture method in which a user moves the wireless mouse according to the pairing instructions display screen a displayed a video display device operably coupled to the information handling system as overlayed on the OOBE system process.

14. The method of claim 9 further comprising:

the hardware processor to execute code instructions of the OEM pairing application system to pair a wireless keyboard as the peripheral HID to the information handling system using a one-click method in which a user presses a single, specific key of the wireless keyboard according to the pairing instructions display screen displayed on a video display device operably connected to the information handling system as the overlayed on the OOBE system process.

15. An information handling system wireless executing code instruction of a human interface device (HID) compliant out of box experience (OOBE) system for operably coupling to a wireless peripheral HID comprising: a hardware processor and a hardware storage device;

the hardware processor to execute code instructions of the wireless HID compliant OOBE system to determine that a stored chassis type for the information handling system indicates the information handling system is a desktop or an all-in-one system;

the hardware processor to execute code instructions of the wireless HID compliant OOBE system to determine if a wireless peripheral device pairing software utility is an original equipment manufacturer (OEM) pairing system application pre-loaded on the information handling system upon manufacture and, if so, to commence executing code instructions of the OOBE system process to set up the operating system on the information handling system via an OEM customized OOBE system process and pair the one or more peripheral HIDs to the information handling system and establish wireless links at the beginning of the OEM customized OOBE system process using the OEM pairing system application with a pairing instructions display screen overlayed on the OOBE system process to coordinate pairing;

the hardware processor to execute code instructions to pair the one or more peripheral HIDs to the information handling system and establish wireless links with the one or more peripheral HIDs before executing code instructions of an OOBE system process to set up an operating system on the information handling system via a wireless HID pre-OOBE utility when the OEM pairing system application is not pre-loaded on the information handling system; and the hardware processor to receive user input received from the established wireless links with each of the one or more peripheral HIDs paired to the information handling system to complete execution of code instruction for the OOBE system process to initialize and set up the operating system for the information handling system.

16. The information handling system of claim 15 further comprising:

the hardware processor to display the pairing instructions display screen overlayed on the OOBE system process to set up the operating system via the OEM customized OOBE system process and execute the OEM pairing application system in coordination with the pairing instruction display screen overlayed to operably couple with the one or more peripheral HIDs via the wireless links before completing the OOBE system process to set up the operating system.

17. The information handling system of claim 15 further comprising:

the hardware processor to insert a second pairing instruction display screen with the wireless HID pre-OOBE utility prior to executing the OOBE system process to set up the operating system and execute the pairing of the one or more peripheral HIDs in coordination with the second pairing instruction display screen via a second type of wireless peripheral device pairing software utility when the OEM pairing application system is not present.

18. The information handling system of claim 15, wherein the one or more peripheral HIDs includes a wireless keyboard.

19. The information handling system of claim 15, wherein the wireless links are established using the Bluetooth® low energy (BLE) communication protocol.

20. The information handling system of claim 15 further comprising:

the hardware processor to execute code instructions of the wireless HID compliant OOBE system to determine that the OEM pairing system application includes pre-loaded pairing credentials at the one or more wireless peripheral HIDs and provisioned to the information handling system to establish the wireless links with each of the one or more peripheral HIDs using minimal user input during the pairing process.

* * * * *